United States Patent
Garcia Morchon et al.

(10) Patent No.: US 11,475,166 B2
(45) Date of Patent: Oct. 18, 2022

(54) COMPILING DEVICE AND METHOD

(71) Applicant: KONINKLIJKE PHILIPS N.V., Eindhoven (NL)

(72) Inventors: Oscar Garcia Morchon, Eindhoven (NL); Alan Pestrin, Salzburg (AT); Willem Charles Mallon, Eindhoven (NL)

(73) Assignee: Koninklijke Philips N.V., Eindhoven (NL)

( * ) Notice: Subject to any disclaimer, the term of this patent is extended or adjusted under 35 U.S.C. 154(b) by 232 days.

(21) Appl. No.: 16/976,511

(22) PCT Filed: Feb. 20, 2019

(86) PCT No.: PCT/EP2019/054133
§ 371 (c)(1),
(2) Date: Aug. 28, 2020

(87) PCT Pub. No.: WO2019/166288
PCT Pub. Date: Sep. 6, 2019

(65) Prior Publication Data
US 2021/0049289 A1   Feb. 18, 2021

(30) Foreign Application Priority Data
Feb. 28, 2018   (EP) .................... 18159169

(51) Int. Cl.
*G06F 21/00*   (2013.01)
*G06F 21/62*   (2013.01)
(Continued)

(52) U.S. Cl.
CPC ............ *G06F 21/629* (2013.01); *G06F 8/433* (2013.01); *G06F 21/64* (2013.01)

(58) Field of Classification Search
CPC ........ G06F 21/629; G06F 8/433; G06F 21/64; G06F 21/14; G06F 8/74; G06F 21/10; G06F 21/12
See application file for complete search history.

(56) References Cited

U.S. PATENT DOCUMENTS

| 6,779,114 B1 | 8/2004 | Chow et al. |
| 2003/0221121 A1 | 11/2003 | Chow et al. |

(Continued)

FOREIGN PATENT DOCUMENTS

| EP | 3502935 A1 | 6/2019 |
| WO | 2018127557 A1 | 7/2018 |
| WO | 2019121831 A1 | 6/2019 |

OTHER PUBLICATIONS

International Search Report and Written Opinion from PCT/EP2019/054133 dated Apr. 5, 2019.

(Continued)

*Primary Examiner* — Ghazal B Shehni

(57) ABSTRACT

Some embodiments are directed to a compiling device (100) configured for selecting of protective transformations to improve security of a computer program. The compiling device is configured to assign protective transformations to parts of the data flow graph, and obtain a compilation of the computer program representation from at least the data flow graph and the assigned protective transformations which satisfy the security and/or the performance target.

17 Claims, 9 Drawing Sheets

(51) Int. Cl.
    *G06F 8/41*        (2018.01)
    *G06F 21/64*      (2013.01)

(56) References Cited

U.S. PATENT DOCUMENTS

| | | | |
|---|---|---|---|
| 2004/0153661 A1 | 8/2004 | Graunke | |
| 2007/0266434 A1* | 11/2007 | Reifer | G06F 21/14 |
| | | | 726/22 |
| 2010/0251378 A1* | 9/2010 | Eker | G06F 21/14 |
| | | | 726/26 |
| 2014/0130154 A1* | 5/2014 | Dolby | G06F 21/577 |
| | | | 726/22 |
| 2015/0193622 A1 | 7/2015 | Burrell et al. | |
| 2016/0239647 A1 | 8/2016 | Johnson et al. | |
| 2017/0024585 A1 | 1/2017 | Mooij et al. | |

OTHER PUBLICATIONS

"Secure Development Is Much Easier Than You Think", Arjuna Shunn, Jul. 22, 2013, Dr Dobbs Journal.

\* cited by examiner

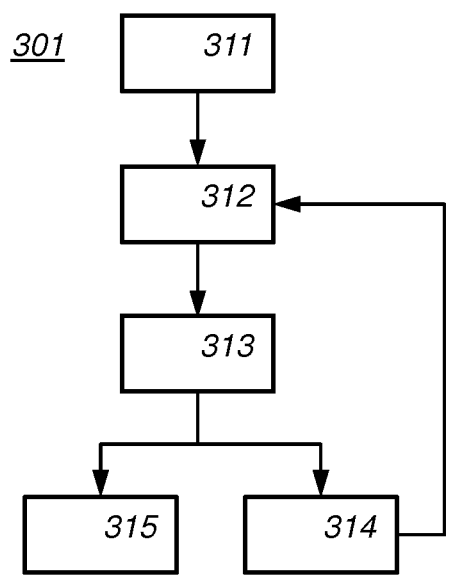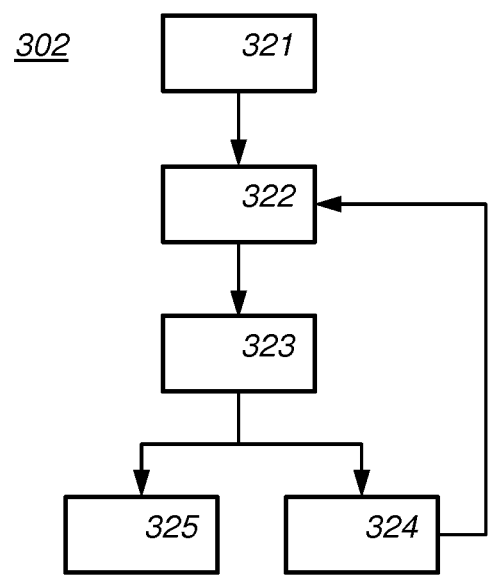
Fig. 3a                    Fig. 3b

COMPILING DEVICE AND METHOD

CROSS-REFERENCE TO PRIOR APPLICATIONS

This application is the U.S. National Phase application under 35 U.S.C. § 371 of International Application No. PCT/EP2019/054133, filed on Feb. 20, 2019, which claims the benefit of EP Patent Application No. EP 18159169.4, filed on Feb. 28, 2018. These applications are hereby incorporated by reference herein.

FIELD OF THE INVENTION

The invention relates to a compiling device, a compiling method, and a computer readable medium.

BACKGROUND OF THE INVENTION

Data used or processed by a program can have a high value. For instance: machine-learning algorithms that allow implementing a given functionality use very specific weights, e.g., of the machine-learning model, learned during a machine learning process. Reverse engineering of the program can reveal those weights so that an attacker can easily replicate or improve the algorithm functionality without requiring access to the data used to train the machine-learning algorithm or computing power to realize the training process. Likewise, some applications compute with secret data, such as secret cryptographic keys. Protecting those keys from unauthorized use is important.

There are various ways to protect computer programs from reverse engineering that might reveal secret information. For example, various known obfuscation methods make it hard to follow the data flow in a computer program.

Furthermore, encodings may be applied to the data, e.g., variables, on which a computer program acts. An attacker who tries to reverse engineer such a protected program does not know on which data the program acts. For example, various white-box encoding may be used. For example, fully homomorphic encryption can be used to protect the algorithms. However, the automated application of these encoding techniques to a program has risks.

However, the direct application of these techniques to a program is not straightforward. On the one hand, the application of encodings to the whole program can lead to a large performance penalty; on the other hand application of less secure encodings can lead to security risks.

A known compiler is described in US2003221121A1. The known compiler protects software against tampering and reverse-engineering. The data flow of the program is transformed so that the observable operations are dissociated from the intent of the original software code. The intention is that an attacker will find it hard to understand and decode the data flow by observing the execution of the code.

SUMMARY OF THE INVENTION

It would be advantageous to have a device and method to automatically determine the protections to be used in a protected program, or at least to assist therein. To achieve these and/or other objectives a compiling device is proposed which is configured for selecting of protective transformations to improve security of a computer program. The compiling device comprises
    an input interface arranged to receive a computer program representation,
    a processor circuit configured to
        obtain a data flow graph representation from the computer program representation,
        repeatedly:
            assign protective transformations to parts of the data flow graph, the protective transformations being selected from a list of available protective transformations,
            determine a performance level and a security level for the data flow graph (200) and the assigned protective transformations,
            if the performance level and the security level satisfy a security and/or a performance target then terminate the assigning of protective transformations,
        obtain a compilation of the computer program representation from at least the data flow graph and the assigned protective transformations which satisfy the security and/or the performance target.

There are various types of protective transformations available, some of which give better protection than others, some of which require more resources than others, e.g., they perform better or worse. Because different protective transformations are tried and evaluated for performance and security an improved selection is made.

The compiling device is an electronic device, for example, the compiling device may be a computer, a server, a desktop computer, a laptop, etc. The compiling device may be combined with other programming tools or further compiling devices, e.g., a linker, etc.

The compiling method described herein may be applied in a wide range of practical applications. Such practical applications include the obfuscation of cryptographic applications, e.g., the encryption, decryption, and authentication of digital messages. For example, the compiling method may be applied to the obfuscation of proprietary algorithms, e.g., learning algorithms, image processing, audio processing, etc.

A method according to the invention may be implemented on a computer as a computer implemented method, or in dedicated hardware, or in a combination of both. Executable code for a method according to the invention may be stored on a computer program product. Examples of computer program products include memory devices, optical storage devices, integrated circuits, servers, online software, etc. Preferably, the computer program product comprises non-transitory program code stored on a computer readable medium for performing a method according to the invention when said program product is executed on a computer.

In a preferred embodiment, the computer program comprises computer program code adapted to perform all the steps of a method according to the invention when the computer program is run on a computer. Preferably, the computer program is embodied on a computer readable medium.

Another aspect of the invention provides a method of making the computer program available for downloading. This aspect is used when the computer program is uploaded into, e.g., Apple's App Store, Google's Play Store, or Microsoft's Windows Store, and when the computer program is available for downloading from such a store.

BRIEF DESCRIPTION OF THE DRAWINGS

Further details, aspects, and embodiments of the invention will be described, by way of example only, with reference to the drawings. Elements in the figures are illustrated for simplicity and clarity and have not necessarily been drawn to scale. In the Figures, elements which correspond to elements already described may have the same reference numerals. In the drawings, FIG. 1a schematically shows an example of an embodiment of a compiling device, FIG. 1b schematically shows an example of an embodiment of a compiling device, FIG. 1c schematically shows an example of an embodiment of a compiling device, FIG. 2a schematically show example of an embodiment of a data flow graph, FIG. 2b schematically show example of an embodiment of a data flow graph, FIG. 3a shows a method to optimize the selection of the protective transformations in the list of available protective transformations, FIG. 3b shows a method to optimize the selection of the protective transformations in the list of available protective transformations, FIG. 4a schematically shows an example of an embodiment of a data encoding and decoding system, FIG. 4b schematically shows an example of an embodiment of a data encryption and decryption system, FIG. 5 schematically shows an example of an embodiment of encoded software, FIG. 6 schematically shows an example of an embodiment of a compiling method, FIG. 7a schematically shows a computer readable medium having a writable part comprising a computer program according to an embodiment, FIG. 7b schematically shows a representation of a processor system according to an embodiment.

Figure 1A:
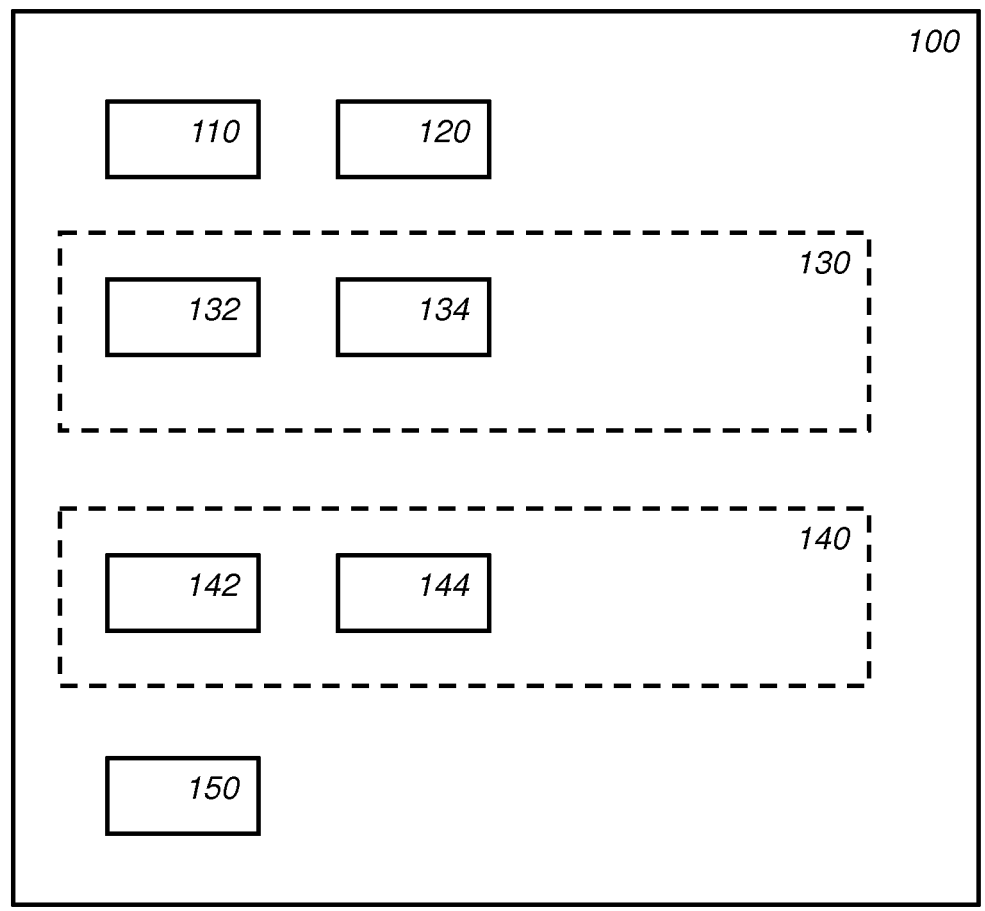

LIST OF REFERENCE NUMERALS IN FIGS.
1a-2b, 4a-5, and 7a-7b 100 a compiling device
110 an input interface
120 a storage
130 a parsing part
132 a dataflow parser
134 an encoding analyzer
140 an optimizer part
142 a performance analyzer
144 a security analyzer
145 a combining part
150 a compiling unit
160 a processor circuit
161 a memory
200 a dataflow graph
210 a copy-phi sub-graph
212-216 a copy or phi node
220, 230 nodes
222-226 a node
232-236 a node
241, 242 a copy-phi network
243 a data manipulation block
244 an encoding
245 an element in a copy-phi network
410 a node
420 a data generator (e.g., sensor)
422 Encode and encrypt (public key: pubK)
430 Software
432 Algorithm
433 Algorithm
440 Hardware
450 Cloud
460 Software (secure environment)
462 Decrypt & Decode
470 Hardware
472 Secure element (private key: pk)
481-483 an encoding
1000 a computer readable medium
1010 a writable part
1020 a computer program
1110 integrated circuit(s)
1120 a processing unit
1122 a memory
1124 a dedicated integrated circuit
1126 a communication element
1130 an interconnect
1140 a processor system

DETAILED DESCRIPTION OF THE EMBODIMENTS

While this invention is susceptible of embodiment in many different forms, there are shown in the drawings and will herein be described in detail one or more specific embodiments, with the understanding that the present disclosure is to be considered as exemplary of the principles of the invention and not intended to limit the invention to the specific embodiments shown and described.

In the following, for the sake of understanding, elements of embodiments are described in operation. However, it will be apparent that the respective elements are arranged to perform the functions being described as performed by them.

Further, the invention is not limited to the embodiments, and the invention lies in each and every novel feature or combination of features described herein or recited in mutually different dependent claims.

As pointed out above, there may be many reasons to protect computer software from unauthorized reverse engineering. For example, the software may represent a cryptographic operation, e.g., an encryption/decryption operation or a signing operation. There is a desire to keep the secret information that is needed for the cryptographic operation secret. The software may also comprise proprietary algorithms, for example, (trained) neural networks, image processing algorithms, etc. There may be a desire to keep the know-how embedded in the software secret. One approach to doing this is to encode, e.g., encrypt the data that is used in the software. The encoded data may be operated upon by suitably adapted software operators. For example, logic or arithmetic operation, etc., may be encoded as tables or as polynomials over a finite field, etc., so that they can act on encoded data. Such operations are known from the field of white-box cryptography. However, these techniques can be applied outside of cryptography as well. An example of encoding data and using tables to operate on the encoded data is given in "White-box Cryptography and an AES Implementation", by S. Chow, et al.

Since there is great potential to apply encoding of data to various types of software, there is a desire to automate the encoding of data. However, it has turned out that this is not so easy. Embodiments describes a system and method to automatically determine the variables and computations to be encoded.

Figure 4A:
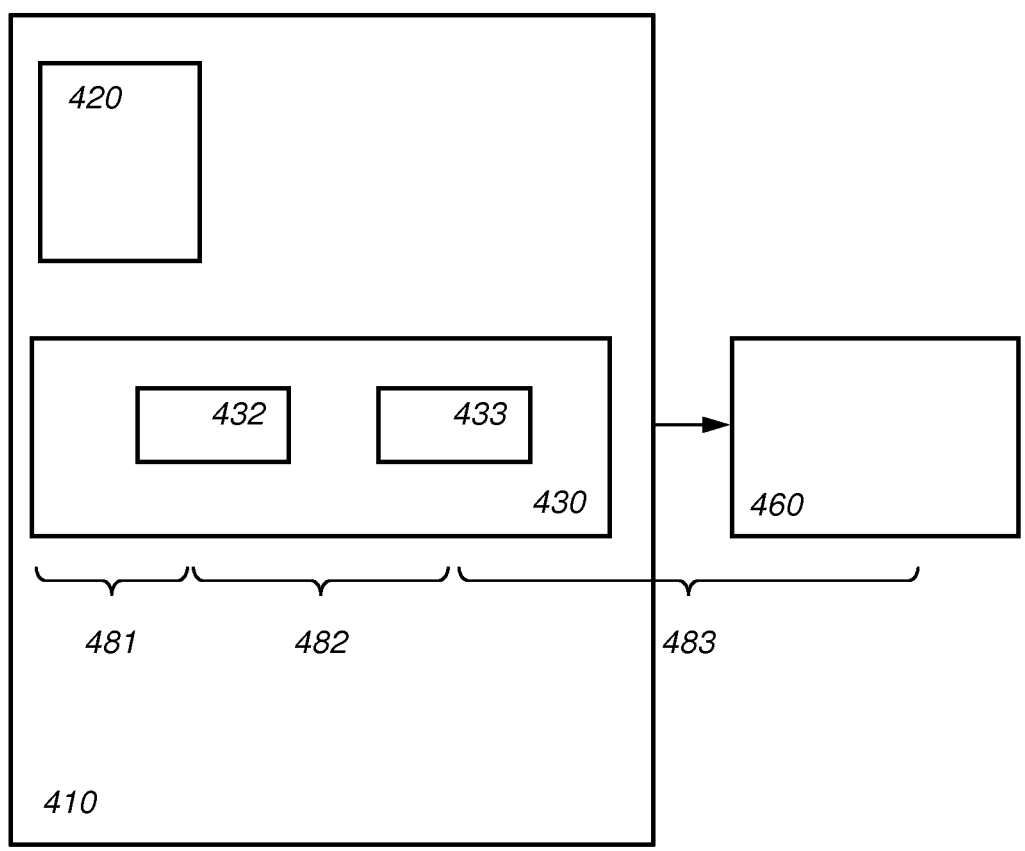

A potential use case is shown in FIG. 4a. FIG. 4a shows a node 410, e.g., a computer, and a possible distribution of encoding to different software/hardware blocks. Node 410 comprises a data generator 420, e.g., a sensor. Node 410 applies algorithms to data produced by generator 420;

shown are algorithms 432 and 433. For example, algorithm 432 may be a signal processing algorithm, and algorithm 433 may be an AES encryption with a secret key. It may be a goal to protect the proprietary signal processing algorithm from being reverse engineered. It may be a goal to protect the encryption, e.g., AES encryption, from having its secret key obtained by an attacker. To obtain these goals, node 410 uses encoding of the data that it operates upon. Shown are three different encodings: encoding 481, encoding 482 and encoding 483. In this case, the output of node 410 is encoded according to encoding 483. In general this is not necessary, outputs may be unencoded, e.g., in this case only encrypted under AES. The output of node 410 is further processed by software 460, e.g., running in a server. Here, software 460 uses at least partly the encoding 483, e.g., to decode the incoming data, but may also partly run on unencoded data.

Figure 4B:
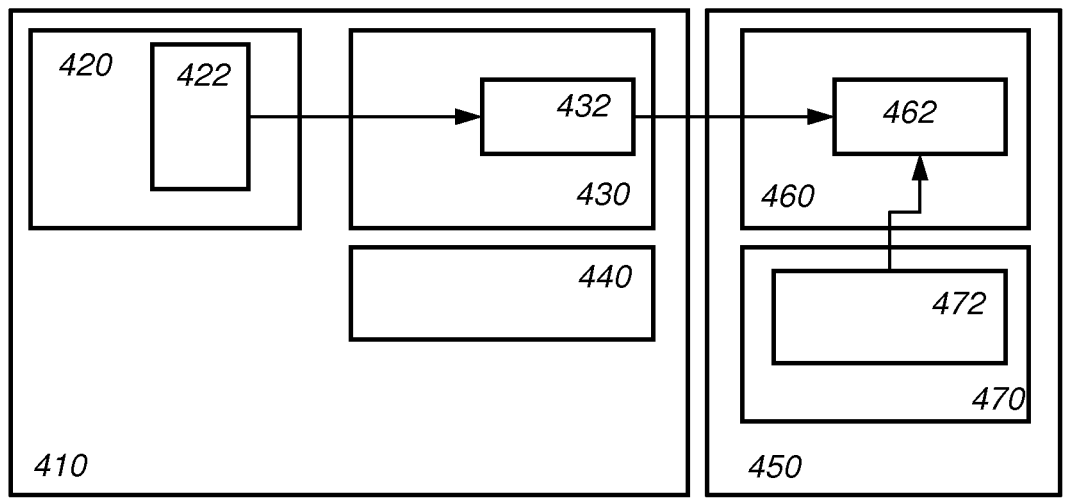

Another example is given in FIG. 4b. During the last years, there has been a huge advance in fully homomorphic schemes and encoding schemes. Using homomorphic schemes make operations on encoded data easier. The first fully homomorphic encryption scheme was proposed by Gentry in 2009. Such a FHE scheme respects both basic algebraic operations, namely addition and multiplication. Since then, many other schemes have been proposed. The Simple Encrypted Arithmetic Library (SEAL) is a practical library that aims at providing a well-engineered and documented homomorphic encryption library. SEAL itself uses the FV homomorphic encryption scheme that relies on the RLWE problem. In any (fully) homomorphic encryption scheme, three keys are involved:

The public-key that is used to encrypt plaintext into cipher text.

The evaluation-key that is used to perform operations (e.g., multiplication) in the encrypted domain.

The private-key that allows the user to decrypt the output.

A potential use case is shown in FIG. 4b. FIG. 4b shows a node 410, e.g., a computer, and the distribution of encoding/decoding, encryption/decryption functions, and private/public/evaluation keys to different software/hardware blocks. Node 410 comprises a data generator 420, e.g., a sensor. The data generator encrypts the data with a public key pubK. Software 430 performs operation on the software in the encrypted domain, using the evaluation key (evalk). There may be multiple algorithms, possibly, using multiple evaluation keys. The results of the computations may be sent to software 460 that runs in cloud 450. For example, the software 460 may be trusted to run in a secure environment. Software 460 decrypts the computation results by applying a decryption algorithm 462. For example, the decryption may use a private key, which is stored in some secure element 472. Thus, software 430 runs at least in part on encrypted data.

If (F)HE is used, then a triple (private key, public key, evaluation key) can be created and distributed over different software and hardware components. For example:

the public-key can be distributed to the software/hardware element in charge of generating data. No protection is required on this key.

the evaluation-key can be distributed to the software/hardware component in charge of processing data. No protection is required on this key. In an embodiment, this key may be used as long as the generated noise is small enough so that decryption is feasible.

the private can be deployed to a secure element associated to software in charge of decrypting input data.

Figure 5:
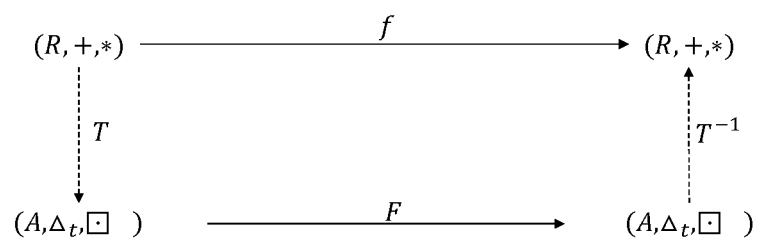

Another application is illustrated in FIG. 5. FIG. 5 schematically shows a representation of operations in the encoded domain. Encoding schemes arising from the field of white-box cryptography have been designed in order to make the reverse engineering of an algorithm and its data more difficult. Encodings can be based, e.g., on (i) nibbles, (ii) residual number systems, or (iii) algebraic transformations, etc. FIG. 5 shows an abstract representation of operations realized in the encoded domain. Instead of an evaluation function f( ) over the ring of integers (R,+,*), the elements in R are transformed by means of transformation TQ into a different domain A such that the same function f( ) can be implemented based on elements represented in A and alternative operations $\Delta_r$, $\boxdot$. This implementation is denoted as F( ) Such a scheme is to some extent similar to (F)HE schemes in the sense that T(0) can represent the usage of a public-key to encrypt data, operations realized in F( ) involve encoded operations and some type of evaluation key, and the inverse transformation is equivalent to the usage of the private key. In white-box cryptography is usual however to merge the usage of the transformations T( ) and $T^{-1}$( ) into the code itself. The difficulty of extraction relies on, e.g., the difficulty of reverse-engineering the large tables etc. that implement them.

In an embodiment, a compiler is configured to automatically create a program P in which the computer program, its variables and/or its processed data is protected. For example, parts of the compiled program may execute in the encrypted domain. This is advantageous since a programmer will often code programs in the plain domain and only later, the programmer will be interested in executing such programs in the encrypted domain. The generation of a program P in the encrypted domain is realized by means of a compiler.

FIG. 1a schematically shows an example of an embodiment of a compiling device 100.

Compiling device 100 comprises an input interface 110 arranged to receive a computer program representation. Compiling device 100 is configured for selecting protective transformations to improve security of a computer program. For example, the computer program may be represented, e.g., written, in a high-level computer program, e.g., in C, Pascal, C#, etc. For example, the computer program representation may be source code. The computer program representation may also be the output of another compiling device which may be arranged for preprocessing computer program code, e.g., by executing macro's, or by parsing computer code. For example, the computer program code representation may be a representation of a dataflow graph of a high-level computer code. The computer program representation may be according to a compiler intermediate language. Input interface 110 may be a communication interface. Compiling device 100 may communicate with other computer devices over a computer network (not shown in FIG. 1a). The computer network may be an internet, an intranet, a LAN, a WLAN, etc. The computer network may be the Internet. The computer network may be wholly or partly wired, and/or wholly or partly wireless. For example, the computer network may comprise Ethernet connections. For example, the computer network may comprise wireless connections, such as Wi-Fi, ZigBee, and the like. The compiling device may comprise a connection interface which is arranged to communicate with other devices as needed, e.g., to receive the computer program representation. For example, the connection interface may comprise a connector, e.g., a wired connector, e.g., an Ethernet connector, or a wireless connector, e.g., an antenna, e.g., a Wi-Fi, 4G or 5G antenna. The computer program representation may be received in electronic form.

Figure 1B:
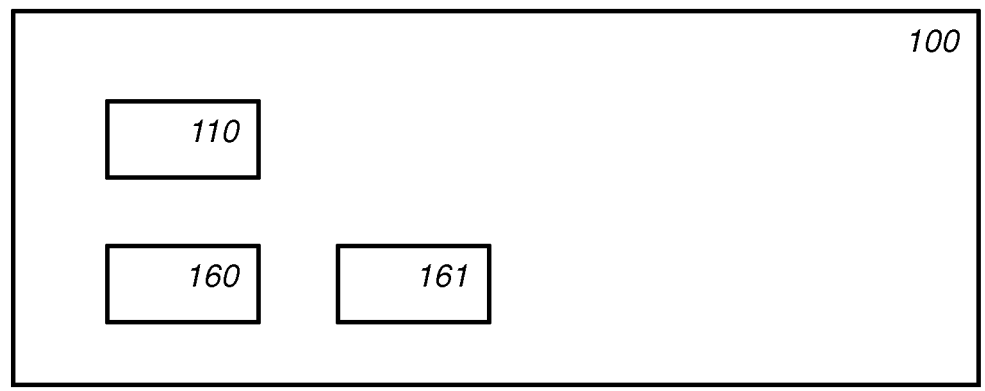

The execution of the compiling device is implemented in a processor circuit, examples of which are shown herein. FIG. 1a shows functional units that may be functional units of the processor circuit. For example, FIG. 1a may be used as a blueprint of a possible functional organization of the processor circuit. The processor circuit is not shown separate from the units in FIG. 1a. For example, the functional units shown in FIG. 1a may be wholly or partially be implemented in computer instructions that are stored at device 100, e.g., in an electronic memory of device 100, and are executable by a microprocessor of device 100. In hybrid embodiments, functional units are implemented partially in hardware, e.g., as coprocessors, and partially in software stored and executed on device 100. FIG. 1b shows a possible embodiment of compiling device 100. FIG. 1b shows a compiling device 100 comprising an input interface 110, a processor circuit 160 and a memory 161. Memory 161 may be used for data and/or instruction storage.

Returning to FIG. 1a. Compiling device 100 comprises a storage 120 for storing the computer program representation, e.g., as received from input interface 110. Storage 120 may also be used for storing intermediate representations, e.g., data flow graphs and the like.

Compiling device 100 comprises a parsing part 130, an optimizer part 140 and a compiling unit 150. The parsing part 130 comprises a dataflow parser 132 and an encoding analyzer 134. Parsing part 130 and encoding analyzer 134 together obtain a data flow graph representation from the computer program representation, wherein at least part of the nodes in the data flow graph are marked as encoded or as non-encoded. For example, dataflow parser 132 may be configured to obtain a data flow graph from the computer program representation. Encoding analyzer 134 may be configured to associate a security and/or a performance target to one or more parts of the data flow graph.

For example, compilation flags or other annotations of the computer program may be defined through which a user can set protection or performance goals before compiling the program. In an embodiment, the compiler analyzes the program to obtain an intermediate representation of a program, and may iteratively estimate the performance and/or estimate the expected security level. Estimation of performance may be done statically, e.g., by counting operations, or dynamically, e.g., by simulating the program. Estimation of security may be done statically, e.g., by referring to fixed security levels associated with respective security measures or dynamically by applying automated attacks to a simulation of the program. The iteration may be done until different types of encodings and protections are applied which fulfill a goal set by the user, e.g., through compilation flags, or until the system determines that the targeted compilation flags are infeasible.

Security goals are important since not all data is equally important. For example, cryptographic data, such as key data, may need a higher security level than encoding for obfuscation of the algorithm. Annotations can be included as a pragma before a program construction such as a variable, function, macro, etc.

In an embodiment, the compiling device determines which nodes are to be protected, e.g., encoded, and which do not need to be encoded. Furthermore, an intermediate representation, e.g., a dataflow graph, may be amended to improve the distribution of encoded and non-encoded nodes. A particular advantageous way to assign protected, e.g., encoded, and non-protected, e.g., non-encoded, to nodes is to use the methods of European patent application . . . filed by the same applicant. It is disclosed, e.g., to automatically determine the variables and computations that are to be encoded in a program. This may be done by looking for dangerous situations in an intermediate representation of a program. Dangerous situations may be solved by code duplication and backwards propagation of computations so that an attacker cannot easily trace the code flow, etc.

The output of encoding analyzer 134 may comprise which variables should be protected and which variables should not be protected in the program; moreover, encoding analyzer 134 may specify security and/or performance targets for the variables. The latter may be expressed by associating security and/or performance targets to parts of the dataflow graph.

Encoding analyzer 134 need not specify how best to achieve the performance/security goals. Selecting protections is not a trivial task since different types of protections, e.g., encodings have different trade-offs regarding security and performance. Often more secret encodings require higher CPU or memory requirements. Furthermore, different types of encoding can be applied to more or fewer of the so-called copy-phi networks, e.g., a part which only relates to the flow of a datum in the program, but this may impact computational performance during compilation, and impact resources during execution, in particular program size.

For example, the data flow graph may be in Static Single Assignment (SSA) form. This is a well-known, popular and efficient flow-exposed form used by software compilers as a code representation for performing analyses and optimizations. Effective algorithms based on Static Single Assignment have been developed to address constant propagation, redundant computation detection, dead code elimination, induction variable elimination, and other requirements.

Efficient algorithms for obtaining a data-flow graph, in particular in SSA form, and to optimize and/or compile a computer program based on a data-flow graph are known. A preferred embodiment is described with respect to static single assignment. A standard reference which may provide background for a standard compiler is "Advanced Compiler Design & Implementation" 1997 by Steven Muchnick (ISBN 1-55860-320-4).

Thus, after partial compilation, we obtain a data-flow graph representation with the static single assignment (SSA) property: each variable is assigned exactly once, and every variable is defined before it is used. In this graph, the edges are (temporal) variables and the nodes are operations $(+,-,*, \ldots)$, memory accesses $(*p= \ldots)$, etc.

Figure 2A:
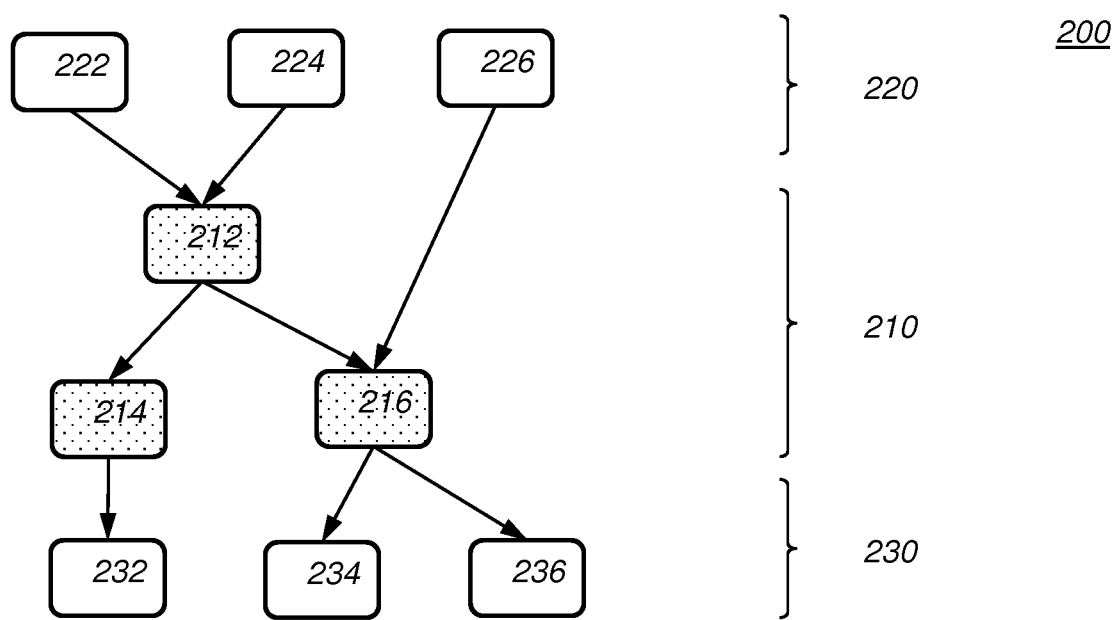

An example of a dataflow-graph in SSA form is shown FIG. 2a. In practice, a data-flow graph may be much larger, in which case, FIG. 2a may be regarded as a detail of a larger data-flow graph. The data-flow graph need not be a data-flow graph of an entire program, but may be data-flow graph a part, e.g., a library, a routine, a basic block, etc.

An SSA graph, in particular SSA graph 200, is a type of data-flow graph that represents an intermediate form of computer program code, e.g., of source code. An SSA graph is directed. The vertices of an SSA graph (also referred to as nodes) represent operations. The edges of an SSA graph represent data holders, such as registers, e.g., including virtual registers, or memory, e.g., selected parts of the memory. FIG. 2a shows an exemplifying SSA graph corresponding to a computer program (fragment). Note that the SSA graphs which are illustrated graphically herein, may be represented as data structures in an electronic memory of compiling device 100.

Two types of nodes in the SSA graph are special: copy nodes and phi-nodes. The SSA graph may contain copy nodes that distribute an incoming value to one or more nodes. FIG. 2a shows one such copy node: copy node 214. A phi operation is used to implement data selection caused by control flow in the graph. For instance, z=phi(a,b) means that when the last assignment to a is more recent than the last assignment to b, then a should be assigned to z. Vice versa for b. Example graph 200 comprises two phi-nodes: phi-node 212 and phi-node 216. Preferably, if a phi-node is to be protected by some kind of encoding, it may be desirable to ensure that all inputs are encoded according to the same encoding scheme.

After parsing and the SSA transform (if needed), the resulting data flow graph may contain sub-graphs, or sub-networks, that consist solely of phi nodes and copy nodes—so-called copy-phi networks. The borders of such a sub-graph are represented by nodes with different types of statements, e.g., arithmetical operations, memory operations, etc. The latter may be referred to as operational nodes.

A datum that is live during execution and which has multiple sources and multiple targets will be visible in an SSA data-flow graph as a copy-phi network. If the data-flow is in SSA format we may thus identify a datum with multiple sources and multiple targets as a copy-phi network. However, this is not necessary. For example, different types of data-flow graphs have different ways of identifying a datum with multiple sources and multiple targets. As the preferred embodiment described herein uses SSA type data-flow graphs, we will continue to refer to copy-phi networks, or copy-phi sub-graphs.

Data-flow graph 200 shows a copy-phi network 210 having 3 nodes. The other nodes in FIG. 2a may represent other operations. For example, nodes 222 and 234 may represent an increment operation, e.g., 'i:=j+1'. For example, node 224 may represent a read from memory operation. For example, node 226 may represent a parameter input, e.g., an input from a parameter to a routine. For example, node 236 may represent an arithmetic operation. The nodes in the copy-phi network are marked with a speckle pattern in FIG. 2a. FIG. 2a shows nodes 220 at an input side of the copy-phi network, and nodes 230 at an output side of the copy-phi network.

The encoding analyzer 134 may mark nodes in the data flow graph as encoded or as non-encoded, and may also associate a security and/or a performance target. For example, this may be done in a compilation pass, e.g., together with parsing for the data-flow graph. Flow control operations, such as the copy or phi nodes need not be marked. Optimizer part 140 may further associate specific protective transformation to parts of the dataflow graph, e.g., as further markings.

The marking of the nodes as encoded or not-encoded and of specific protective transformation may later be used by compilation unit 150. For example, compilation unit 150 may use native operation to act on non-encoded nodes. For example, an increment operation can be implemented by compiling unit 150, e.g., by a machine 'INC' instruction. For encoded operation, compiling unit 150 may use encoded operations, for example, a library may be called to perform the operation. For example, compiling unit may call an 'ENC_INCO' operation to perform an encoded increment. An encoded function receives encoded data and outputs encoded data. For example, encoded operations may be implemented as a table, or as a polynomial over a finite field.

In order to protect a program, its variables and/or the processed data, it is desirable to have a process that automatically creates a program P that is executed in the encrypted domain. For example, a programmer may write programs in the plain domain and only later, the programmer will be interested in executing the programs in the encrypted domain. By automatically, or manually, or part-manual/part-automatic marking of nodes, the compiler unit 150 has the information needed to call the correct encoded or non-encoded functions. Yet, development of the program could take place without much attention to these matters.

For example, in an embodiment, the compiling device selects a number n of encoding domains and partitions the operations into the number of encoding domains. Increasing the number increases security, e.g., against white-box attacks, but it will also increase the footprint of the program.

Marking nodes as encoded or not-encoded may be done according to encoding rules. For example, a rule base may require some nodes to be non-encoded. For example, nodes corresponding to memory accesses, external function calls, and parameters may be marked non-encoded. For example, in an embodiment, some nodes may be marked non-encoded according to the rules, and all nodes that are left may be marked encoded. For example, in an embodiment restrictions on encoding may be come from interfaces, e.g., the computer code must interface with devices, memories, or other software that is not compatible with the encoding used. Restrictions on encoding may also come from restrictions in the compiling unit or library used. For example, some operations may not be supported in encoded form, e.g., operations on floating point numbers, etc.

For example, in an embodiment, a two-step approach may be used. Some nodes have to be non-encoded according to the rules, e.g., the ones corresponding to memory accesses, external function calls, etc. All others nodes may initially be marked as encoded. According to further rules, e.g., heuristics, some nodes may be marked non-encoded even if they were initially encoded. For example, after parsing it may turn out that some operations cannot be performed in encrypted form, e.g., the library does not support them. For example, some nodes may correspond to operations on floating point numbers, but encoded floating point operations may not be available. The compiling unit may output a warning or an output log or the like, so that a programmer can verify which operations are performed in encoded form and which are not. In an embodiment, a programmer may insert compiler directives in the computer program representation. For example, in source code the programmer may indicate which variables are to be encoded, or which variables are not to be encoded. In an embodiment, all nodes, except copy-phi nodes, are marked encoded or non-encoded.

In an embodiment, parsing part 130 may also modify the dataflow graph to accommodate the encodings, e.g., to avoid phi-nodes receiving multiple different encodings, or to avoid sub-graphs in the dataflow graph which are known to be dangerous.

Compiling device 100 comprises an optimizer part 140. Optimizer part 140 is arranged to assign protective transformations to parts of the data flow graph. For example, device 100 may comprise a list of available protective transformations from which optimizer part 140 may select the protective transformations.

Optimizer part 140 comprises a performance analyzer 142 and a security analyzer 144. The performance analyzer 142 is arranged to determine a performance level for the data flow graph 200 and the assigned protective transformations. Performance typically relates to time-performance, but may also relate to size-performance, e.g., the size of the compiled program. Hybrid definitions of performance are also possible.

There are several ways in which a performance level can be determined. For example, performance analyzer 142 may be configured to count the number of operations of multiple types in the data flow graph and obtaining the expected cost when those operations are substituted by encoded operations according to the assigned protective transformation.

For example, performance analyzer 142 may count the number of nodes in dataflow graph 200 and the type of operation they perform. Each protective measure may have an associated performance penalty which may be stored together with the list of available protective measures. For example, performance analyzer 142 may determine that there are 15 nodes which are an increment operation, 10 of which are encoded by replacing the increment operation with an ENC_INC table look-up; 2 of which are masked but operate on plain data and 3 of which are unprotected. The associated performance may be say 1.6, 0.4 and 0.1 respectively, for a total of $10*1.6+2*0.4+3*0.1=17.1$. Alternatively, a performance penalty may be estimated, which in this case may be 1.5, 0.3 and 0, respectively, for a total of $10*1.5+2*0.3=15.6$. This does not take loops into account but is sufficient to obtain a rough estimate of the performance penalty that is incurred by the operations.

In a more advanced embodiment, loops are taken into account, e.g., either by estimating the number of times a loop is taken at compile time or by simulating the computer program on exemplary inputs. For example, simulation may be done directly on the intermediate representation, e.g., on the dataflow graph, or a temporary compilation may be performed for the purpose of simulation, e.g., using a profiler. In an embodiment, a simulation is done for exemplary input data, after which the number of times the nodes are executed is recorded, e.g., profiled. The recorded execution numbers are then used to weigh the static performance levels. For example, continuing the example above, one of the nodes may be executed 10 times, but the rest may be executed only once. In this case, the former node receives a ten times higher weight when computing the performance level.

After deciding which nodes are encoded, and which nodes are not, protective measures, e.g., encodings and conversions between encodings, may be inserted in the data flow graph. Inserting the conversions keeps the data flow graph valid: in a dataflow graph with encoded and/or non-encoded operations, the program may not work properly without conversions.

Optimizer part 140 comprises a security analyzer 144 arranged to determine a security level for the data flow graph 200 and the assigned protective transformations. The security level may be computed on the level of the whole dataflow graph or a sub-graph thereof, but may also be computed on the level of individual nodes and/or edges. For example, in an embodiment, security targets may be assigned to one or more edges and/or nodes in the data flow graph. The security target may be obtained from the security targets obtained for the one or more edges and/or nodes in the data flow graph. Estimating security level may be done in a similar way as estimating performance level. For example, one may add the security level of individual nodes and/or edges. Typically, it is not needed to weigh the nodes with the expected number of times the node will be executed.

The security level may indicate the type of protection that is desired. For example, the security target may comprise a security type. Examples of security types include confidentiality and integrity. In the former, an attacker should not be able to obtain the plain value of a variable, whereas in the latter he should not be able to modify the value. A modified value may be detected, but it may also be allowed to happen so-long the end-results of the computation are randomized. For example, the latter may be achieved by encoding variables together with a check-value, e.g., a constant value, or a function of the variable. So-long the check-value is correct it does not influence computation with the variable, but if the check-value is incorrect it does, so that future computation are distorted once an attacker makes a modification. See, for example, international patent application WO2015082212A1, "A computing device for iterative application of table networks".

The security target may also comprise an attack type. The attack type indicates the type of attacks against which the compiler should protect. Examples include: white-box, in which an attacker has full read and write access to the software while it is running; side-channel-time, in which an attacker has access to input and output values and the time the program or parts thereof take to execute, side-channel power, in which an attacker has access to input and output values and the power that is consumed while the program executes. To protect against side channel attacks, the protective measures could include constant time or constant power operations, or the insertion of randomizing dummy operations.

The security target could include an attack effort, e.g., the amount of effort an attacker is expected to invest in attacking the program. For example, the attack effort could be high, medium, best effort. The effort could also be represented as a number 100, 10, 1, etc.

For example, replacing an increment operation by an encoded increment ENC_INC may have a medium security rating for white-box and a high rating for constant time. However, a protection in which the increment is combined with other operations may have a higher white-box rating, etc.

In a more advanced embodiment, the security level is estimated using automated generic attacks. Generic attacks are attacks which operate without knowledge of the internals of a program. They can even be run against a program by the compiler itself, since not knowledge of the type of attack etc. is needed.

For example, in an embodiment, the security target indicates an input variable, and a secret variable. For side-channel type operations it is desirable that the secret variable is not or little correlated with the observable information in the program. Note that for the correlation the secret variable in an unprotected version of the program may be used, whereas for the observable information a program with assigned protective measures is used.

The security level may be estimated by
  obtaining multiple executions of the computer program for different values of the secret variable and optionally for different values of the input value, recording the values of an observable, e.g., at least one variable of the computer program that depends on the input variable during execution of the computer program, e.g., a sequence of values taken on by the variable throughout execution, and/or recording the operation time of the operations performed on the at least one variable, and/or the estimated power consumption, etc., For example, the secret value may be a secret key, or part thereof, e.g., the first byte. For example, the input value may be an input message which is to be encrypted with the secret key. If some variables correlate with the secret key, they may leak information about the secret key, which may be undesirable.

computing a correlation between the secret variable without assigned protective transformation and the observable, e.g., recorded values or operation times, etc.

If the correlation between the observable, e.g., the at least one variable is high, then security is low, since the secret variable may be estimated from the observable variable. If the correlation is close to 0 or ideally 0, the security is higher. For example, a security target A may be associated with a correlation below 0.01, and a security target B with a correlation below 0.1. The security target A will give better resistance against side-channel attacks but may require a higher performance cost.

Optimizer part 140 is configured to repeat the assigning of protective transformations to parts of the data flow graph until the performance level and the security level satisfy a security and/or a performance target. For example, the assigned protective transformations may be modified in part to better attain the goals. For example, for some variables protective transformations may be used with increased security levels, for others protective transformations may be used with lower security levels, etc. When the targets are attained, or when reaching the goals seems unattainable, e.g., after some amount of time has elapsed, optimizer 140 may terminate the assigning of protective transformations.

There are various ways in which optimizer part 140 may perform the optimization. For example, the optimization may follow a predetermined sequence in which, e.g., first user indicated variables are protected, then small variable are protected before large variables, etc. Alternatively, optimizer 140 may use one of various optimization techniques. For example, optimizer 140 may perform a random walk and keep the best selection. For example, optimizer 140 may perform a greedy optimization in which first parts are protected that have the largest contribution to the user target. For example, optimizer 140 may perform hill climbing, simulated annealing, tabu search, and the like.

For example, a number of encodings to be used may be fixed in advanced, to a number n. Next each operator that can be encoded, is randomly assigned to an encoding domain. Security level is computed by computing the correlation between a secret key and the variables. Assignment to encoding domain is then repeatedly modified according to an optimization method such a hill climbing, etc., to minimize the correlation, e.g., to minimize the largest correlation, or the total sum of the all correlations, etc.

Finally, compiling part 150 is configured to obtain a compilation of the computer program representation from at least the data flow graph and the assigned protective transformations which satisfy the security and/or the performance target.

FIG. 3a shows a method 301 to optimize the selection of the protective transformations in the list of available protective transformations. The method comprises assign 311 initial protective transformations to parts of the data flow graph that are selected so that the associated security levels achieve the security target. For example, the protective transformation may be chosen to have a security levels above a threshold, or they may be chosen to be the highest (best) security level transformations, the performance level is determined 312 if the determined performance level is below the performance target 313, one or more assigned protective transformations are modified 314 to protective transformations with a lower associated security level. The method is then iterated until the target is achieved.

If the target is achieved, the method is terminated 315.

FIG. 3b shows a method 302 to optimize the selection of the protective transformations in the list of available protective transformations. The method comprises assign 321 initial protective transformations to parts of the data flow graph that are selected so that the associated security levels are below the security target. For example, the protective transformation may be chosen to have a security levels below a threshold, or they may be chosen to be the lowest (worst) security level transformations, the performance level is determined 322 if the determined performance level is above the performance target 323, one or more assigned protective transformations are modified 324 to protective transformations with a higher associated security level. The method is then iterated until the target is achieved. If the target is achieved the method is terminated 325. Compilation may be performed with the last set of protective transformations for which the performance level was still above the performance target.

In method 301 security is reduced until a performance target is met. In method 302 a different approach is used, in this case a performance budget is consumed to best meet a security target. It depends on the desired trade-off which of methods 301 and 302 is best for a given situation.

The protective transformation that can be assigned, e.g., that are in the list, may be comprises one or more variable-protections for edges and/or operation-protections for nodes of the data flow graph. For example, possible transformations include encoding of variables and plain execution of operation on de-coded variables. In this situation, variables are encoded most of the time, but are decoded just before and after they are operated upon. Encoding could be a random bijective operation, possible including a state, e.g., salt, value. Encoding could also be a masking operation, e.g., adding, e.g., xor-ing, a random value.

encoding of variables and encoded execution of operation on said encoded variables. In this situation, variables are encoded but are also operated upon in encoded form. This is generally a more expensive operation since it may require look-up tables, or polynomials, or the like to perform the operations.

homomorphic encrypting applied to variables and/or operations.

Constant time execution operations. In this case, variables need not be encoded but the operations performed on them are independent upon their values. This may imply that operations always perform in a worst-case time.

Assigning a particular protective measure often has implications. If an operation is to be performed on encoded data, this means that the data should be available in encoded form. If further operations are to be performed on the data, it should be prepared to accept the data in the same encoding. This may be achieved by inserting conversion nodes in the dataflow graph the convert from one type of encoding to another type.

This may be managed by assigning nodes and/or edges to an encoding domain. Multiple encoding domains may be established. Parts of the dataflow graph assigned to the same encoding domain are assigned the same protective transformation. Typically, having more encoding domains is beneficial for security, on the other hand having multiple encoding domains may increase the footprint of a program.

For example, suppose two algorithms A and B specified in the software above are implemented by functions fA and fB described in column 1 in the table below. In the next columns 2, 3, and 4 and assuming that each of those two functions are assigned two different SSA networks with different security goals, then the functions may be replaced by two look up tables (column 2), encoding/decoding functions may be applied (column 3) whose strength depends on the target security goals. In the final column, tables can be combined further obfuscating the implemented function. Each subsequent step can increase security, but also performance is affected. Thus, the algorithm applies those steps carefully to protect as much as possible while fulfilling performance requirements.

| Program | Conversion into two look up tables | Adding of Encoding E1 and decoding E1i (Encrypted edges) | Table composition |
|---|---|---|---|
| int fA(int a, int b) { return a + 47 *b; } int fB(int a, int b) { return a * b * b; } int program(int a, int b) {     int c = fA(a,b);         return fB(a,c); } | FA = TA(a,b) Return {TB(a, FA)} | FA = E1(TA(a,b)) Return {TB(a, E1i(FA))} | Return T=TB(a,TA(a,b)) |

In an embodiment, the compiler device may receive one or more of the following inputs:
 (i) A program that is to be protected (e.g., a c program or an intermediate program representation such as a data flow graph)
 (ii) One or more performance goals for the protected program;
 (iii) target security level in the different parts of the program;
 (iv) list with available types of encodings and protections with security/performance properties The compiler device may be configured to classify program parts according to performance requirements (number of operations, type of operations) and outputting a performance ranking for the different program parts according to individual performance and overall resource requirements in the total program. This can be done by counting each type of operation using certain operands and computing the expected cost when those operations are substituted by encoded operations knowing the cost of encoding operations. The overall performance can be obtained by executing the input program on the target device. The performance after securing it can be obtaining by estimating the additional cost of protecting specific parts of the program. The performance penalty may be calculated as:

(PerformancePlain+EstimatedPerformancePartsProgramProtected)/PerformancePlain

The compiler device may be configured to classify networks according to security requirements specified, e.g., by means of annotations and type of data/operations being executed. The output may be a security list ranking the required security in different program parts. This prioritization can be done by analyzing the type of operations used in a network, how well they can be protected, and how relevant a network is for others.

Annotations can be included as a pragma before a program construction such as a variable, function, macro, etc. Annotation options include:
 Type: confidentiality, integrity, availability
 Attack: white-box, side-channel-time, side-channel power
 Effort: high, medium, best effort.

Type means the type of protection that is enabled. Confidentiality implies encrypting the program parts annotated with the pragma. Integrity means including integrity checks ensuring that the program cannot be modified. Availability means adding capabilities to ensure that the code is executed. For example, by duplicating a function to make sure that the function is run at least once. For example, the latter may be used to verify that a user is authorized before executing the remainder of a program.

With attack, we mean the type of attack that is performed and that determines the types of protections that should be applied. With white-box we mean that an attacker has access to the whole code and can observe/modify everything. Thus, the resulting implementation should output a protected program that is encoded or encrypted. With side-channel time, we mean that an attacker that can observe the execution time of the program and derive information from it. Thus, a protected program should be such that the execution time is either constant (so that an attacker does not learn anything) or adds a large enough random delay that is execution dependent so that an attacker cannot derive the actual execution time. With side-channel power, we mean that an attacker can observe the power traces. Thus, the program should be such that instructions with different power requirements are substituted by virtualized instructions (e.g., table lookups) of constant power consumption.

With effort, we mean how good the resulting protection should be. A) High: it shall provide the best available security. B) Medium, it should provide as good security as possible. No security is not an option. C) Best effort, it should provide as good security as possible but if it is not feasible due to performance reasons, then a plain implementation is fine.

Annotations are powerful, but a programmer might forget to add them. The compiler can further analyze whether, e.g., program parts contain computational parts in which input data is mixed with specific constants. Such program parts are ideal candidates to protect by means of encryption. The compiler system can also analyze whether a given program part performs operations that depend on an input variable leading to time dependencies with the input. Such program parts would be ideal for protection from side-channel timing attacks. The compiler system can trigger a warning if such a part is not protected alerting the programmer. Alternatively, the compiler can be enhanced with compilation flags (e.g., -p1, -p2, -p3) so that it can automatically apply protections of increasing level.

Once analyzing the program input is done, the compiler device may determine encodings and protections to use depending on optimizations and target protection level.

if optimization for security:
assign best type of encoding/protection to each program part and estimate performance (memory/CPU),
while (performance WORSE THAN performance goal) {apply simpler encoding/protection to program parts with lower security needs},
if resulting protection is lower than required, then the compiler system should trigger a warning to alert the programmer from the situation.

if optimization for performance:
assign most performing type of encoding or protection to each program part and estimate performance (memory/CPU),
while (performance BETTER THAN performance goal) {apply more secure encoding to networks with higher security needs},
if resulting protection is lower than required, then the compiler system should trigger a warning to alert the programmer from the situation.

In an embodiment, the compiler device may obtain an intermediate representation of the program in which—depending on the annotations used:

for confidentiality, each variable is assigned two labels, the first one defining type of encoding to be used and the second one defining the encoding domain.
For integrity, program parts are enhanced blocks determining integrity checks.
For availability, program parts demanding high availability would be replicated n-times. Each of the copies would be placed in a different location of the program to difficult the task of the attacker to disable them
For white-box attacks, variables should be denoted to be encoded so that an attacker cannot understand them.
For side-channel timing attacks, program parts and variables prone to them should be marked to be executed in either constant time or large execution-dependent timing noise is added. Constant-time implies that operations and memory accesses should be constant-time. For execution-dependent timing noise, program parts would be enhanced with blocks that introduce a large time variability depending on random data.
For side-channel power attack, instructions with different power requirements may be substituted by virtualized operations with constant power consumption.

Finally, the encodings and protections may be assigned correspondingly. For instance:

If encodings:
If the compilation is for a single device, then determine that the data may be encoded through the device.
If the compilation is for multiple devices, then determine that input/output data interfaces of consecutive devices should use the same encodings. Optionally, extend the code by including an encoded implementation of a symmetric encryption algorithm (e.g., AES) in the device generating data and the corresponding encoded symmetric decryption algorithm (e.g., AES) in the device consuming data.

If (F)HE:
If the compilation is for a single device, then determine that input data should be encrypted and operations through the device should be performed in the encrypted domain. When noise increases too much, then involve communication with secure element storing the private key used to decrypt data and further encrypting it again, potentially with the public-key assigned to another network.
If the compilation is for different devices, then data should be encrypted, operations should be performed in encrypted domain. The decryption only takes place in the receiving device.

If availability protection is required:
If compilation is for a multicore CPU, assign execution of each replicated program part to a different core.
If compilation is for a multi-device system, assign execution of each replicated program part to a different device.

If side-channel power protection, analyze power consumption of different instructions on the processor where the program is executed and convert those instructions into look-up tables of constant power consumption.

If side-channel time protection with constant-time, analyze time requirements for different instructions on the processor where the program is executed and memory accesses and convert those instructions into look-up tables of constant time access.

To perform the compilation, the compiler device, e.g., in part 140 or 150, may be configured to create the en/decodings and protections and apply them to each program parts according to the obtained labels.

Figure 1C:
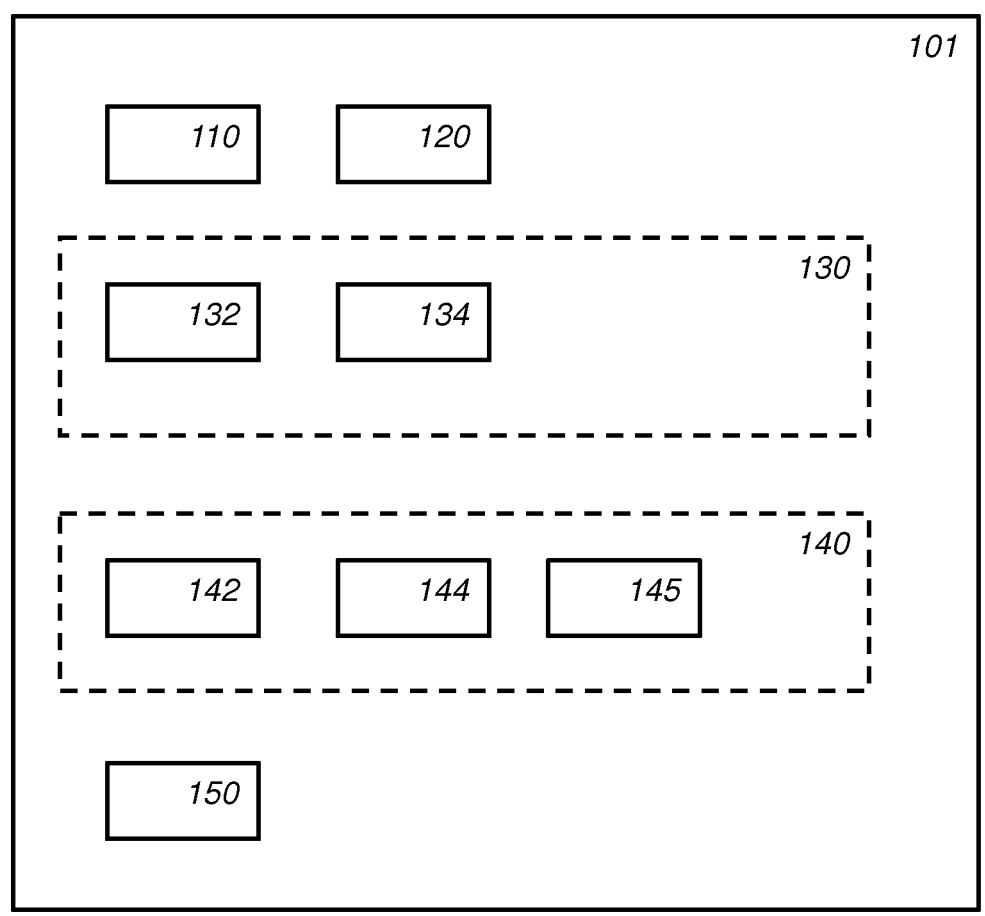

FIG. 1c schematically shows an example of an embodiment of a compiling device 101. Compiling device 101 is similar to compiling device 100 except that it is configured to combine operations before applying a protective transformation; for example, compiling device 101 comprises a combining part 145, e.g., in optimizer part 140, which is configured thereto.

Like compiling device 100 it may be configured to detect variables that can be protected, but combining device 145 is configured to select operations that act on the detected variables and combine them. The combined operations can be protected as above. For example, a combined operation can be encoded, e.g., in a look-up table or as a polynomial.

Compiling device 101 also uses a method to optimize parameters for the protections according to input performance goals, such as CPU penalty and memory penalty.

In an embodiment, each operation that is to be protected is assigned to its own encoding domain. All selected functions are transformed into table look-ups and between them bijections are introduced to translate from one encoding to the next. In an embodiment, at least two operations are protected using the same encoding, so that no bijection between them is needed to translate from one encoding to the next. Reducing the number of encodings increases the likelihood that an operation can be re-used, and so reduces the number of required look-up tables, or the like.

In an embodiment, compiling device 100 is configured with three phases:
1. Detect variables that can be protected
2. Combine statements
3. Apply n encodings and transform statements into lookup tables Based on the 3 phases, the compiler system can apply an optimization algorithm that takes as input performance goals, e.g., CPU penalty and memory penalty, to optimize parameters for the above passes.

For example, in phase 1, variables which can be protected can be detected as follows: A variable v can be protected if these requirements are met:
1. v is used in statements which can be converted into lookup tables
2. v can be encoded without revealing the encodings A variable v can be protected if it is used in assignments which can be converted into lookup tables of reasonable size. In order to measure the size of such lookup tables, an intermediate representation of the program in which v is used is taken as input. This intermediate representation may have the SSA property.

Consider the following fragment:
(1) input1=phi(a,b);
(2) input2=c;
(3) output=g(input1, input2);

In assignment statements, such as (3), the total input size in bits s can be defined in this way:

$$\Sigma_{i=1}^{nofinputs} \text{range}(input_i)=$$

Note that function range returns the number of bits that are required by the input to be represented properly. This function can also be substituted by another function that just returns the type of the input. The input size in bits of an assignment statement indicates the number of entries e that a lookup table which implements the left hand side of the assignment may have. We have $e=2^s$. In other words, e gives an indication of the size of the lookup table which implements the left hand side of the assign statement. For statements with large values of s, the size of the resulting lookup tables might make the program too big to be practically implemented and executed. For example, the performance targets may set a limit on the amount of memory which can be used for look-up tables. Therefore, requirement 1 imposes a constraint on the maximum allowed value of s and therefore on the size of the generated lookup tables which impacts on the overall size of the protected program.

A variable v can be protected if the encodings used for protecting it can be merged in lookup tables. In order to determine if this is the case, statements which use and generate v have to be analysed. As an example, the protection of the following function (in which statements are in SSA) can be considered:

```
function f(b,c) {
(1) a = g(b,c);
(2) x = h(c);
(3) d = y(a);
(4) e = x;
(5) z = i(d, e);
(6) return z;
}
```

Suppose, the maximum total input size s, from above requirement, which is allowed is 16 [bit]. Suppose that variable c has size 18 [bit] and all the other variables have range 8 [bit]. Here, b, c and z cannot be protected since they are arguments and return of the function. The function's signatures or api have to be kept plain since they are the interface with the non-protected code. Variables a, x and e cannot be protected either since a and x are the left hand side of statements which cannot be converted into lookup tables (which could safely integrate the encoding). However, variable d can be protected since:

It is the left hand side of statement (3) which can be converted in a lookup table (which can safely integrate the encoding).

It is used in the right hand side of statement (5) which can be converted in a lookup table (which can safely integrate the decoding).

Compiling device 101, e.g., combining part 145, is configured to combine operations. For example, in a phase 2, after variables that can be protected are identified, statements may be combined. For example, combining part 145 may be configured to determine functionally subsequent statements, e.g., statements in which an output variable of one is an input of the next one. Subsequent statements may be combined in a single statement.

When the maximum variable size of the resulting statement is less than the maximum size defined in the previous section, the left hand side variable of the resulting statement can be also protected.

For instance, assume the following program and a maximum variable size of 16 [bit]:
(1) a=b+c//b and c have range of 4 bits, and a has range of 5 bits
(2) f=d*a//d and e have range of 4 bits, and f has range of 8 bits
(3) h=a-f//a has range of 5 bits, f range of 8 bits, and h range of 13 bits Then the three statements in line 1, line 2, and line 3 can be first combined into a single statement: h=(b+c)−(d*(b+c))=(1−d)*(b+c)

Note that applying encodings to input and/or output variables of the resulting statement and transforming the resulting statement into an encoded lookup table significantly increase the protection against reverse engineering and against white-box attacks. This holds because the effort needed to reverse engineering an encoded lookup table which implements a function composed by multiple elementary operations is greater than the one needed for reverse engineering an encoded lookup table which implements a simple arithmetic function only.

Note also that in the above example the resulting total input variable size is 4+4+4=12 [bit] and therefore the statement can be transformed into a single encoded lookup table. The exact introduction of encodings is part of the third phase, e.g., after having introduced encodings in the next phase. The just described approach for combining statements is advantageous in terms of speed.

In a phase 3, encodings and transform statements may be applied and lookup tables may be formed. At this point the following inputs are available: (1) the set of variables which can be protected and (2) a set of performance/security constraints. For example, (2) can be the maximum number of encodings that can be applied in a program (or part of a program). (2) can also be the amount of memory required by a program so that it is possible to derive from it the maximum number of encodings that can be applied.

A possible implementation of this example is:
n=0: any number of encodings can be used. Typically, a different encoding is used to protect each variable.
n=1: the same encoding (per variable size) is to be used in the whole program.
n=2: two different encodings (per variable size) can be used in the whole program.
n= . . . : . . .

Note that the number of encodings is per variable size since the size needs to match the variable size. Given the input, then the compiler system assigns the encoding to each variable which can be protected. If n=0, then each variable will use a different encoding. For other n options, then the compiler system can use different alternatives. The simplest one consists in applying encoding i to variable variable j (mod n). For instance:

| Var 1 | Var 2 | ... | Var n | Var n + 1 | Var n + 2 | Var 2n |
|-------|-------|-----|-------|-----------|-----------|--------|
| Enc 1 | Enc 2 |     | Enc n | Enc 1     | Enc 2     | Enc 2n |

Another option is to assign encodings in a randomized way, e.g., Var j←Enc_i where i←random(n)

Note also that if variables have different ranges (or types), then different encodings may be applied as well even if the operation (e.g., +, −, XOR, . . . ) is the same. Note also that using a large number of encodings leads to a significant increase of size since in this case, if the same function is present at left hand sides of multiple statements, different lookup tables with different encodings will be created.

Given memory penalty, the compiler system can:
1. Obtain memory performance for plain program once compiled in the current machine.
2. Based on input penalties, the compiler system can obtain the absolute increase in memory that is allowed in the protected program according to the input parameters.
3. Based on the absolute increase in memory, the compiler system can then compute the required encodings to fit in the program within the memory constraints.

For instance, if the maximum memory increase is 10 KB, then encoding a function that depends on an input variable that is 2 bytes long is not feasible since it would require $2^{16}/1024=64$ KB of memory. However, encoding a function that depends on a 8-bit variable is feasible since it requires $2^{8}/1024=256$ B of memory.

Note also that based on the absolute increase in CPU and memory, the compiler system can then compute the maximum size of the variables that can be encoded if all variables are using different encodings. The process to determine variables is to scan the program (in its intermediate representation) ranking the variables and functions from small to large. Once the variables are ranked, then the compiler system starts computing the amount of memory that is left after decided to encode x variables (starting from the small ones). The process finish when no memory budget is available.

The optimization process for the CPU performance is similar. However, in this case, the goal is to minimize the number of table look-ups and therefore, the goal will be to start applying all encodings to be able to merge as much as possible. While the CPU performance is better than required, then the compiler system will check the consumed memory. If the memory is too high, then the compiler system will progressively unmerge the encoded tables starting with those of largest inputs till the memory requirements are fulfilled.

Taking as input performance goals such as CPU penalty and memory penalty, it is possible to optimize the parameters for the above passes. For example, compiling device 101 can apply an optimization algorithm. There are different possibilities for this optimization process. For example, compiling device 101 be configured for:

First, determining the maximum number of encodings of various sizes which can be introduced. This can be done by scanning the program, e.g., in its intermediate representation, and classifying the copy-phi networks in groups based on size, e.g., and counting them. Copy-phi networks are subnetworks of the program graph representation constituted solely by copy or phi statements. This means that all variables in a copy-phi network have the same range and that in copy-phi network no manipulations on the data is performed.

For example, each group contains the number of copy-phi networks for every variable range (e.g., 8-bit, 16-bit, 32-bit) present in the program. This returns a list which maps every range of protectable variables in the program to the number of copy-phi networks for that range. For instance, the list L below means that there are 45 copy-phi networks of range 8-bits, 23 of range 12-bits and 76 of range 16-bits: L=[[8, 45],[12,23],[16,76]]

Figure 2B:
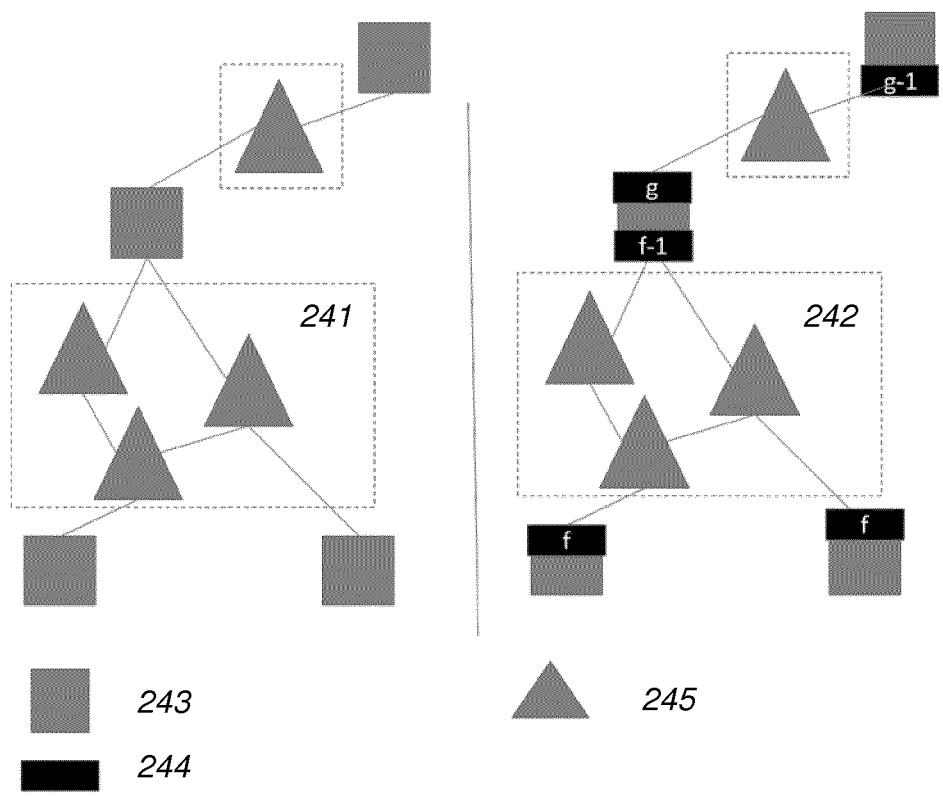

The same encoding has to be used in all data manipulation blocks at the borders of a copy-phi network. In particular, we can see that the same encoding has to be applied to every source node of the copy-phi network, while the encoding inverse has to be applied to every destination node of the copy-phi network. This is illustrated in the example dataflow graph of FIG. 2b. In FIG. 2b, 241 and 242 are copy-phi networks; 243 is a data manipulation block, e.g., an operator; 244 is an encoding; 245 an element in a copy-phi network; letters g and f refer to encodings. At the right side of the FIG. 2b encodings have been applied in the data-flow graph.

Next, the program has to find the number of encodings that maximize the program strength for the available memory. Note that the maximum number of encodings applicable is always equal to the numbers of copy-phi networks contained in the program since the outputs from the data manipulation blocks that go through the copy-phi network need to be reversed in the data manipulation blocks that consume that data. This optimization step can be done in several ways. The first one consists in introducing first new encodings for all the data manipulation blocks of the copy-phi networks of the smallest range and only when all of them have been introduced moving to the next range till the maximum amount of memory is allocated. For instance, in the above example, one first creates encodings for the variables in copy-phi networks of 8-bits and then moves to the creation of encodings for type 12-bits and so on. The second method consists in starting with the range of largest size (in above example, size 16-bits) and keep creating them for the range of maximum size till all the required encodings have been computed and then move to the next type of smaller size (in this case, 12-bit). The third method consists in adding encodings for each of the available data ranges in a consecutive manner. In above example, start with encoding for size 8-bit, then add another for encoding of size 12-bit, then add another for encoding of size 16-bit and then start again from size 8-bit . . . . This process finishes when all available memory has been allocated.

For example, operation nodes in the dataflow graph may have an associated encoding memory requirement. For example, operator may be implemented as an encoded operator in the form of a polynomial over a finite field, or in the form of a look-up table. The associated encoding memory requirement may be two to the power of the total bit size of the input(s) times the number of bits in the output of the operator. Some of the operator cannot be encoded based on this size, e.g., it is larger than a threshold. Based on a memory size available for encoding, the compiling device can decide which and/or how many encoding to apply. For example, the compiling device may assign different encoding starting from the smallest associated size until the available memory for encodings is exhausted. For example, the compiling device may first apply a single encoding to each variable size. If memory is still available for encoding, then memory may be allocated from smallest to largest.

For example, the compiling device may first apply a different encoding to each variable size identified as high-security, e.g., by the user of by analyzing part 130, etc. Next, a single encoding to each variable size. If memory is still available for encoding, then memory may be allocated from smallest to largest.

These methods have the advantage that after assuring a basis level of encoding is achieved, different encoding are concentrated in the smaller variables. Since smaller variables require much less memory for encoding than larger variables, these increases the number of different encodings used. This strategy is, e.g., useful for obfuscation purposes, since attackers will need to deal with many different encodings rather than a few.

Encoding may be based on bijections, possibly with a salt or state value. Alternative encodings can also be used, e.g., based on Residual Number systems (RNS) in which the variables belonging to a specific type are first encoded in an RNS consisting of m elements (for m different prime numbers) and then bijections are applied to each of the elements.

The encodings can also be based on Fully Homomorphic Encryption so that different public-keys and different evaluation-keys are used to evaluate variables of different types.

In the various embodiments of compiling device 100 or 101, the communication interface or input interface may be selected from various alternatives. For example, the interface may be a network interface to a local or wide area network, e.g., the Internet, a storage interface to an internal or external data storage, a keyboard, an application interface (API), etc.

The compiling device may have a user interface, which may include well-known elements such as one or more buttons, a keyboard, display, touch screen, etc. The user interface may be arranged for accommodating user interaction for performing a compiling action, etc.

Storage 120 may be implemented as an electronic memory, say a flash memory, or magnetic memory, say hard disk or the like. Storage 120 may comprise multiple discrete memories together making up storage 120. Storage 120 may also be a temporary memory, say a RAM. In the case of a temporary storage 120, storage 120 contains some means to obtain data before use, say by obtaining them over an optional network connection. Typically, the compiling device 100 and 101 comprise a microprocessor which executes appropriate software stored at the device 100 and 101; for example, that software may have been downloaded and/or stored in a corresponding memory, e.g., a volatile memory such as RAM or a non-volatile memory such as Flash (not separately shown). Alternatively, the devices 100 and 101 may, in whole or in part, be implemented in programmable logic, e.g., as field-programmable gate array (FPGA). Devices 100 and 101 may be implemented, in whole or in part, as a so-called application-specific integrated circuit (ASIC), e.g., an integrated circuit (IC) customized for their particular use. For example, the circuits may be implemented in CMOS, e.g., using a hardware description language such as Verilog, VHDL etc.

In an embodiment, a compiling device may comprise an input interface circuit, a storage circuit, a parsing part circuit, a dataflow parser circuit, an encoding analyzer circuit, a optimizer part circuit, a performance analyzer circuit, a security analyzer circuit, a compiling unit circuit. The device 100 may comprise additional circuits, e.g., a combining part circuit. The circuits implement the corresponding units described herein. The circuits may be a processor circuit and storage circuit, the processor circuit executing instructions represented electronically in the storage circuits.

A processor circuit may be implemented in a distributed fashion, e.g., as multiple sub-processor circuits. A storage may be distributed over multiple distributed sub-storages. Part or all of the memory may be an electronic memory, magnetic memory, etc. For example, the storage may have volatile and a non-volatile part. Part of the storage may be read-only.

Figure 6:
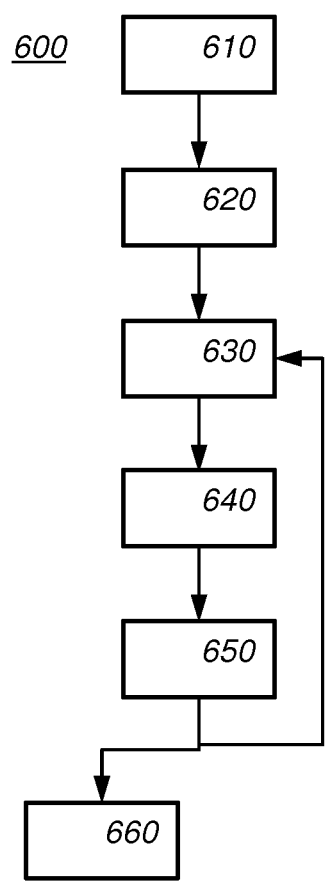

FIG. 6 schematically shows an example of an embodiment of a compiling method 600. Compiling method 600 is configured for selecting of protective transformations to improve security of a computer program. Compiling method 600 comprises receiving 610 a computer program representation,
    obtaining 620 a data flow graph 200 representation from the computer program representation,
    repeatedly:
        assigning 630 protective transformations to parts of the data flow graph, the protective transformations being selected from a list of available protective transformations,
        determining 640 a performance level and a security level for the data flow graph 200 and the assigned protective transformations,
        if the performance level and the security level satisfy a security and/or a performance target then terminating the assigning of protective transformations. For example, method 600 may comprise a conditional branching 650 towards the assigning 630 or towards obtaining 660.
        obtaining 660 a compilation of the computer program representation from at least the data flow graph and the assigned protective transformations which satisfy the security and/or the performance target.

Many different ways of executing the method are possible, as will be apparent to a person skilled in the art. For example, the order of the steps can be varied or some steps may be executed in parallel. Moreover, in between steps other method steps may be inserted. The inserted steps may represent refinements of the method such as described herein, or may be unrelated to the method. Moreover, a given step may not have finished completely before a next step is started.

A method according to the invention may be executed using software, which comprises instructions for causing a processor system to perform method 600. Software may only include those steps taken by a particular sub-entity of the system. The software may be stored in a suitable storage medium, such as a hard disk, a floppy, a memory, an optical disc, etc. The software may be sent as a signal along a wire, or wireless, or using a data network, e.g., the Internet. The software may be made available for download and/or for remote usage on a server. A method according to the invention may be executed using a bitstream arranged to configure programmable logic, e.g., a field-programmable gate array (FPGA), to perform the method.

It will be appreciated that the invention also extends to computer programs, particularly computer programs on or in a carrier, adapted for putting the invention into practice. The program may be in the form of source code, object code, a code intermediate source, and object code such as partially compiled form, or in any other form suitable for use in the implementation of the method according to the invention. An embodiment relating to a computer program product comprises computer executable instructions corresponding to each of the processing steps of at least one of the methods set forth. These instructions may be subdivided into subroutines and/or be stored in one or more files that may be linked statically or dynamically. Another embodiment relating to a computer program product comprises computer executable instructions corresponding to each of the means of at least one of the systems and/or products set forth.

Figure 7A:
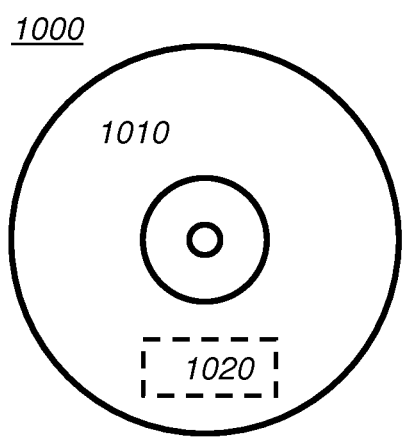

FIG. 7a shows a computer readable medium 1000 having a writable part 1010 comprising a computer program 1020, the computer program 1020 comprising instructions for causing a processor system to perform a compiling method, according to an embodiment. The computer program 1020 may be embodied on the computer readable medium 1000 as physical marks or by means of magnetization of the computer readable medium 1000. However, any other suitable embodiment is conceivable as well. Furthermore, it will be appreciated that, although the computer readable medium 1000 is shown here as an optical disc, the computer readable medium 1000 may be any suitable computer readable medium, such as a hard disk, solid state memory, flash memory, etc., and may be non-recordable or recordable. The computer program 1020 comprises instructions for causing a processor system to perform said method of compiling.

Figure 7B:
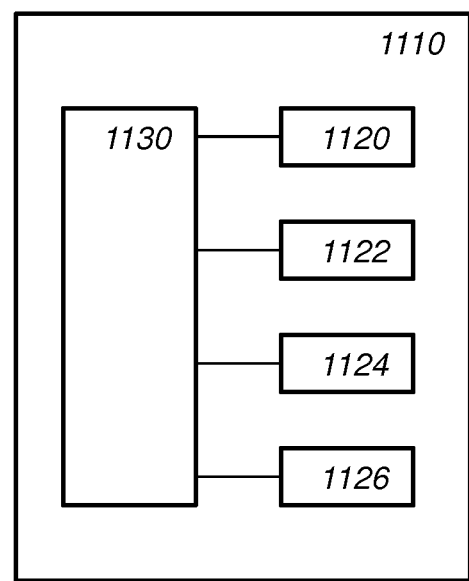

FIG. 7b shows in a schematic representation of a processor system 1140 according to an embodiment of a compiling device. The processor system comprises one or more integrated circuits 1110. The architecture of the one or more integrated circuits 1110 is schematically shown in FIG. 7b. Circuit 1110 comprises a processing unit 1120, e.g., a CPU, for running computer program components to execute a method according to an embodiment and/or implement its modules or units. Circuit 1110 comprises a memory 1122 for storing programming code, data, etc. Part of memory 1122 may be read-only. Circuit 1110 may comprise a communication element 1126, e.g., an antenna, connectors or both, and the like. Circuit 1110 may comprise a dedicated integrated circuit 1124 for performing part or all of the processing defined in the method. Processor 1120, memory 1122, dedicated IC 1124 and communication element 1126 may be connected to each other via an interconnect 1130, say a bus. The processor system 1110 may be arranged for contact and/or contact-less communication, using an antenna and/or connectors, respectively.

For example, in an embodiment, processor system 1140, e.g., the compiling device may comprise a processor circuit and a memory circuit, the processor being arranged to execute software stored in the memory circuit. For example, the processor circuit may be an Intel Core i7 processor, ARM Cortex-R8, etc. In an embodiment, the processor circuit may be ARM Cortex M0. The memory circuit may be an ROM circuit, or a non-volatile memory, e.g., a flash memory. The memory circuit may be a volatile memory, e.g., an SRAM memory. In the latter case, the device may comprise a non-volatile software interface, e.g., a hard drive, a network interface, etc., arranged for providing the software.

It should be noted that the above-mentioned embodiments illustrate rather than limit the invention, and that those skilled in the art will be able to design many alternative embodiments.

In the claims, any reference signs placed between parentheses shall not be construed as limiting the claim. Use of the verb 'comprise' and its conjugations does not exclude the presence of elements or steps other than those stated in a claim. The article 'a' or 'an' preceding an element does not exclude the presence of a plurality of such elements. The invention may be implemented by means of hardware comprising several distinct elements, and by means of a suitably programmed computer. In the device claim enumerating several means, several of these means may be embodied by one and the same item of hardware. The mere fact that certain measures are recited in mutually different dependent claims does not indicate that a combination of these measures cannot be used to advantage.

In the claims references in parentheses refer to reference signs in drawings of exemplifying embodiments or to formulas of embodiments, thus increasing the intelligibility of the claim. These references shall not be construed as limiting the claim.

The invention claimed is:

1. A compiling device comprising:
an input interface circuit, wherein the input interface circuit is arranged to receive a computer program representation,
a processor circuit,
wherein the processor circuit is arranged to
obtain a data flow graph representation from the computer program representation,
wherein the processor circuit is arranged to assign at least one protective transformation(s) to parts of the data flow graph,
wherein the at least one protective transformation(s) is selected from a list of available protective transformations,
wherein the processor circuit is arranged to determine a performance level and a security level for the data flow graph,
wherein the processor circuit is arranged to determine a performance level and a security level for the assigned protective transformations,
wherein if the performance level and the security level satisfy a security and/or a performance target then processor circuit terminates the assigning of protective transformations,
wherein the processor circuit is arranged to obtain a compilation of the computer program representation from at least the data flow graph and the assigned protective transformations,
wherein the compilation of the computer program representation satisfies the security and/or the performance target.

2. The compiling device as in claim 1,
wherein the protective transformations in the list of available protective transformations have an associated security level,
wherein the compiling device is arranged to assign at least one initial protective transformation(s) to parts of the data flow graph that are selected such that the associated security levels achieve the security target,
wherein if the determined performance level is below the performance target one or more of the assigned protective transformations are modified to protective transformations with a lower associated security level, and
wherein the compiling device is arranged to assign initial protective transformations to parts of the data flow graph that are selected such that the associated security levels are below the security target,
wherein if the determined performance level is above the performance target one or more of the assigned protective transformations are modified to protective transformations with a higher associated security level.

3. The compiling device as in claim 1, wherein the available protective transformations comprise one or more variable-protections for edges and operation-protections for nodes of the data flow graph.

4. The compiling device as in claim 1,
wherein the processor circuit is arranged to obtain one or more security targets for one or more edges and/or nodes in the data flow graph,
wherein the security target is obtained from the security targets obtained for the one or more edges and/or nodes in the data flow graph.

5. The compiling device as in claim 1, wherein the at least one protective transformation(s) comprise one or more of encoding of variables and plain execution of operation on de-coded variables, encoding of variables and encoded execution of operation on said encoded variables, homomorphic encrypting applied to variables and/or operations, constant time execution operations.

6. The compiling device as in claim 1,
wherein parts of the dataflow graph are assigned to an encoding domain of multiple encoding domains,
wherein parts of the dataflow graph assigned to the same encoding domain is assigned the same protective transformation.

7. The compiling device as in claim 1, wherein the security target comprises a target for security type, including confidentiality and integrity, and/or attack type, including, e.g., white-box, side-channel-time, side-channel power, and/or attack effort.

8. The compiling device as in claim 1,
wherein the performance level is determined by counting the number of operations of multiple types in the data flow graph and obtaining the expected cost,
wherein operations of multiple types are substituted by encoded operations according to the assigned protective transformation.

9. The compiling device as in claim 1,
wherein the security target indicates an input variable, and a secret variable,
wherein the security level is estimated by obtaining multiple executions of the computer program for different values of the input variable and secret variable, recording the values of at least one variable of the computer program that depends on the input variable during execution of the computer program, and/or recording the operation time of the operations performed on the at least one variable, computing a correlation between the secret variable without at least of the assigned protective transformations and the recorded values or operation times.

10. The compiling device as in claim 1, wherein the processor circuit is arranged to combine operations before applying at least one of the protective transformation.

11. The compiling device as in claim 1,
wherein operation nodes in the dataflow graph have an associated encoding memory requirement,
wherein the processor circuit is arranged to introduce different encodings for the operation nodes from smallest associated encoding memory requirement to the largest,
wherein the processor circuit allocates memory to the encoded operation nodes until a maximum amount of memory is allocated.

12. The compiling device as in claim 1,
wherein the protective transformations in the list of available protective transformations have an associated security level,
wherein the compiling device is arranged to assign at least one initial protective transformation(s) to parts of the data flow graph that are selected such that the associated security levels achieve the security target,
wherein if the determined performance level is below the performance target one or more of the assigned protective transformations are modified to protective transformations with a lower associated security level, or
wherein the compiling device is arranged to assign initial protective transformations to parts of the data flow graph that are selected such that the associated security levels are below the security target,
wherein if the determined performance level is above the performance target one or more of the assigned protective transformations are modified to protective transformations with a higher associated security level.

13. The compiling device as in claim 1, wherein the available protective transformations comprise one or more variable-protections for edges or operation-protections for nodes of the data flow graph.

14. A compiling method comprising
receiving a computer program representation,
obtaining a data flow graph representation from the computer program representation,
assigning at least one protective transformation(s) to parts of the data flow graph, wherein the at least one protective transformation(s) is selected from a list of protective transformations,
determining a performance level, a security level for the data flow graph and the at least one of the assigned protective transformation(s),
if the performance level and the security level satisfy a security and/or a performance target then terminating the assigning of the at least one protective transformations,
obtaining a compilation of the computer program representation from at least the data flow graph and the at least one of the assigned protective transformation(s) which satisfy the security and/or the performance target.

15. A computer program stored on a non-transitory medium, wherein the computer program when executed on a processor performs the method as claimed in claim 14.

16. A compiling device comprising:
an input interface circuit, wherein the input interface circuit is arranged to receive a computer program representation,
a processor circuit,
wherein the processor circuit is arranged to obtain a data flow graph representation from the computer program representation,
wherein the processor circuit is arranged to assign a first protective transformation to parts of the data flow graph,
wherein the first protective transformation is selected from a list of available protective transformations,
wherein the processor circuit is arranged to determine a performance level and a security level for the data flow graph,
wherein the processor circuit is arranged to determine a performance level and a security level for the first assigned protective transformation,
wherein if the performance level and the security level satisfy a security and/or a performance target then processor circuit terminates the assigning of additional protective transformations, wherein the processor circuit is arranged to obtain a compilation of the computer program representation from at least the data flow graph and the first assigned protective transformation, wherein the processor circuit is arranged to assign a second protective transformation to parts of the data flow graph, wherein the second protective transformation is selected from the list of available protective transformations, wherein the processor circuit is arranged to determine a performance level and a security level for the second assigned protective transformation, wherein the processor circuit is arranged to obtain a compilation of the computer program representation from at least the data flow graph and the second assigned protective transformations, wherein the compilation of the computer program representation satisfies the security and/or the performance target.

17. A compiling method comprising receiving a computer program representation, obtaining a data flow graph representation from the computer program representation, assigning a first protective transformation to parts of the data flow graph, wherein the first protective transformation is selected from a list of protective transformations, determining a performance level, a security level for the data flow graph and the first assigned protective transformation, if the performance level and the security level satisfy a security and/or a performance target then terminating the assigning of an additional protective transformation, obtaining a compilation of the computer program representation from at least the data flow graph and the first assigned protective transformation which satisfy the security and/or the performance target, assigning a second protective transformation to parts of the data flow graph, wherein the second protective transformation is selected from a list of protective transformations, determining a performance level, a security level for the data flow graph and the second assigned protective transformation, obtaining a compilation of the computer program representation from at least the data flow graph and the second assigned protective transformation which satisfy the security and/or the performance target.

* * * * *